April 1, 1958 A. M. LIPPISCH 2,828,929
WINGLESS AIRCRAFT
Filed May 27, 1954
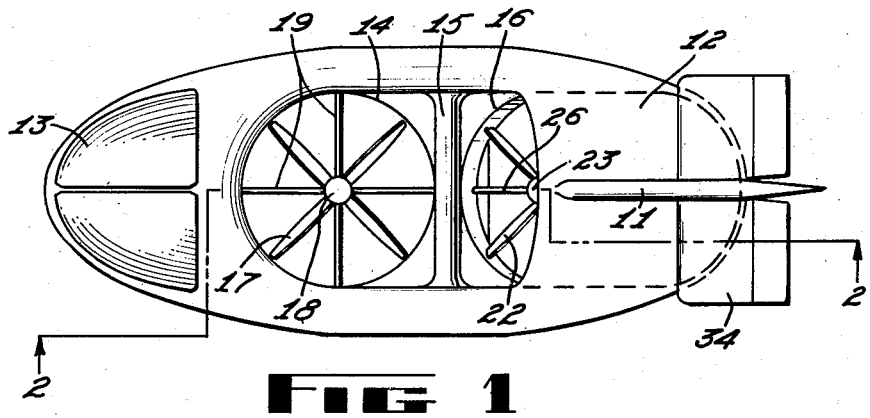
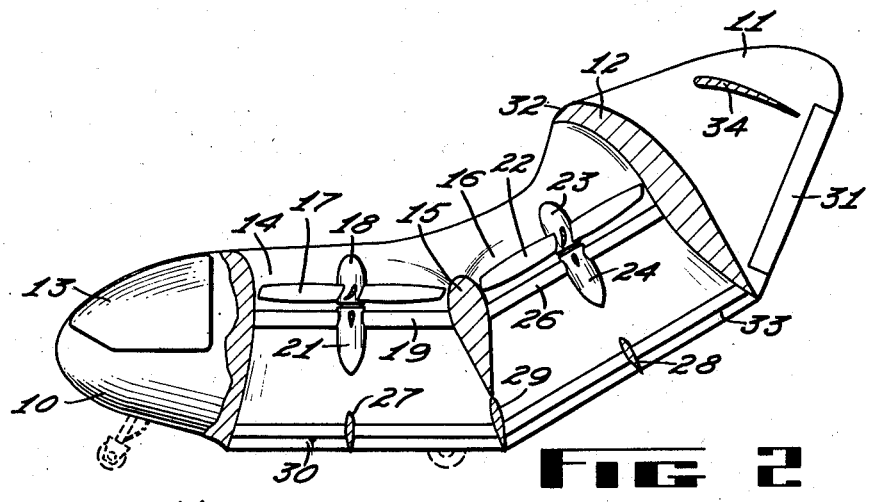
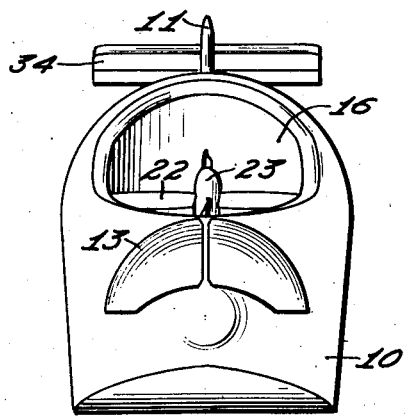
INVENTOR
ALEXANDER M. LIPPISCH
BY
ATTORNEY

United States Patent Office 2,828,929
Patented Apr. 1, 1958

2,828,929
WINGLESS AIRCRAFT

Alexander M. Lippisch, Cedar Rapids, Iowa, assignor to Collins Radio Company, Cedar Rapids, Iowa, a corporation of Iowa Application May 27, 1954, Serial No. 432,860

6 Claims. (Cl. 244—23)

This invention relates in general to a wingless aircraft and in particular to an aircraft capable of taking off and landing with zero forward velocity and moving forward very rapidly after leaving the earth.

As aircrafts are flown at higher and higher speeds, the drag from the wing has become a limiting factor. Since drag increases with the velocity squared, it soon reaches tremendous proportions at supersonic speeds.

Also, the greatest danger in aircraft occurs during take-offs and landings when a relatively high velocity parallel to the earth is required to obtain a small vertical velocity. This large horizontal velocity generally causes the aircraft to be demolished when something goes wrong in the take-off and landing.

The present invention relates to an improvement wherein a pair of propellers are enclosed in a body for simultaneous production of lift and forward motion and are tilted against each other at an angle so that a slight rotation of the craft will greatly increase the forward thrust.

It is an object of this invention to provide an aircraft that may be landed and taken off with zero horizontal velocity and which is capable of moving forward at great velocity and with small drag.

A feature of this invention is found in the provision for a pair of shrouded propellers enclosed in a body and which are tilted against each other at a slight angle so as to controllably provide lift and forward propulsion.

Further objects, features and advantages of this invention will become apparent from the following description and claims when read in view of the drawings, in which:

Figure 1 is a top view of the wingless aircraft of my invention;

Figure 2 is a sectional view taken on line 2 of Figure 1; and

Figure 3 is a front view of the aircraft of my invention.

Referring to the drawings, Figure 1 illustrates a body member 10 which has an elevator 34 and fin 11 connected to a rear portion 12 thereof and which has a pilot's compartment 13 mounted in the forward portion.

As shown in Figure 2 in dotted lines, retractable wheels may be mounted to the underside of the body portion 10 for engaging the ground. It is to be particularly noted that the rear portion 12 of the aircraft body projects upwardly for a purpose to be described later.

Extending through the body portion are a pair of ducts 14 and 16 which are inclined at an angle relative to each other of approximately 30 degrees. A portion 15 of the body portion 10 separates the ducts 14 and 16. The first duct 14 has mounted therein a propeller 17 which has a suitable hub 18. The propeller 17 is mounted on a shaft rotatably supported by supports 19 that are attached to the body of the aircraft 10. Propeller 17 may be driven by a power plant 21 mounted to the supports 19 or alternatively, it may be driven through suitable gearing and mechanical connections from a central power plant mounted elsewhere in the aircraft.

The second duct 16 contains a propeller 22 which has a hub 23 and which is mounted on a suitable driving shaft that is supported by supports 26. Supports 26 are attached to the walls of the duct 16. A power plant 24 may be supported by the inner ends of supports 26 to drive the propeller 22, or alternatively, the propeller may be driven through gearing and mechanical connections by a central power plant which drives both propellers 17 and 22.

Mounted below the propeller 17 within the duct 14 is a controllable vane 27 which may be located on a suitable shaft supported by the body portion 10. Another control vane 30 is mounted at right angles to control vane 27. Likewise, a control vane 28 is rotatably supported on the duct 16 below the propeller 22 and another control vane 33 is mounted at right angles thereto.

Another control vane 29 is attached to the bottom end of the separating portion 15 and is pivotally supported by the body portion 10 to control the aircraft. A rudder 31 is mounted in the fin 11 and may be used to control the aircraft.

It is particularly noted that the rear portion 12 of the body portion 10 extends substantially upward to a point 32. This is so that as the aircraft moves forwardly through the air, large quantities of air will be sucked through passage 16.

The body of the aircraft is mainly streamlined, but designed to surround the ducts in such a way that there is enough space in the front part as well as on the sides of the body to provide room for the crew, the engines, the fuel, and the cargo.

The pilot's cabin is in the forward portion of the aircraft. The space in the body between both ducts and on both sides can be used to house an engine. The ducts themselves may each contain a single propeller counter-rotating against each other, or may each contain two counter-rotating propellers, to avoid the gyroscopic moments as well as the predominant rotation of the slipstream.

The flow through the propellers is straightened out by stators 19 and 26 which can be favorably used also as supports for the propeller shafts. These stators can be made adjustable for different working conditions.

The air flow enters a diffuser section of the ducts below the props so that large mass flow can be obtained. At the exit of the diffuser control vanes 27 and 30 are arranged perpendicular to each other to be used for controlling pitch, roll and yaw. Vanes 27 and 28 transverse to the direction of flight control the pitch, since their action controls the vertical direction of the outflow of air.

The vanes 30 and 33 in the direction of the motion are geared to control in such a way that for rolling their motion is in the same direction, both left or both right, while for yaw the sense of rotation is opposite to each other. The gearing mechanism is the same as commonly used on so-called "elevons," aileron and elevator control flaps.

The rear duct 16 is inclined towards the direction of forward motion so that its slipstream produces lift and propulsion and so that otherwise the combined slipstream from both ducts has a divergent, that is, a diffusing flow. By such means the entire flow through both ducts will be increased since the pressure at the exit of the diffuser will be lower than the normal pressure.

The rear part of the back duct is formed like a scoop in order that a larger amount of air will pass through it when forward motion is established. A cross-section through the rear part of this duct is, therefore, similar to a cambered wing section so that the outer flow in forward flight will produce a certain amount of lift on the outer walls of the rear duct.

To achieve more stabilization under forward flight conditions, the elevator 34 may be trimmed or controlled to also adjust pitch. This elevator must be set at a certain angle of incidence since the flow at the rear part has a considerable downward direction.

To obtain different speeds in flight, from zero speed to high forward speeds, the axis of the craft is controlled in pitch. If the craft is controlled in such a way that a certain positive incidence is maintained the craft will hover, since the main direction of the outflow will be vertically downward. If the incidence in pitch is decreased, the craft will move forward and the forward speed will increase, the angle of incidence becoming lower and lower until it reaches certain negative values where the propulsive force equals the parasitic drag of the body. Such motion will be obtained by setting the pitch flaps as well as trimming the position of the elevator. Both can be combined in the most favorable manner.

Thus, the craft may be lowered or raised vertically to clear the ground. Then by pitching forward a slight bit, forward speed will commence. As the forward speed becomes greater and greater the pitch may be continually increased until an extremely high velocity is obtained. Since the lift required to support the aircraft remains constant for zero acceleration in the vertical plane, it can be obtained with the aircraft pitched forward at high speeds.

It is seen that the invention provides an improved high speed wingless aircraft.

Although this invention has been described with respect to particular embodiments thereof, it is not to be so limited as changes and modifications may be made therein which are within the full intended scope of the invention, as defined by the appended claims.

I claim:

1. A wingless aircraft comprising, a body member formed with an upwardly extending rear portion, first and second ducts formed through said body portion, said ducts formed at an angle of approximately thirty degrees relative to each other in the shape of an inverted V, said inverted V extending along said body member, the more rearward duct forming with said upwardly extending rear portion an airfoil, said airfoil providing lift in flying position, a first propulsion means mounted in the first duct, a second propulsion means mounted in the second duct, and an aerodynamic control means mounted on said body member to control the aircraft in pitch, yaw and roll.

2. A wingless aircraft comprising, a body portion of a generally elongated shape and with an upwardly extending rear end, first and second ducts formed through said body portion along a longitudinal axis in the shape of an inverted V, the more rearward duct forming with said upwardly extending rear end an airfoil, said airfoil providing lift in flying position, said ducts formed at an angle less than ninety degrees relative to each other, a first propulsion means mounted in the first duct, a second propulsion means mounted in the second duct and aerodynamic control surfaces mounted on said aircraft to control it in pitch, yaw and roll.

3. A wingless aircraft comprising, a generally elongated body portion having an upwardly extending rear end, a first and second ducts formed along the longitudinal axis of said body portion and extending generally vertical through said body portion, said ducts inclined relative to each other at an angle of less than sixty degress in the shape of an inverted V, the more rearward duct forming with said upwardly extending rear end an airfoil, said airfoil providing lift in flying position, a first propulsion means mounted in the first duct, a second propulsion means mounted in the second duct, and aerodynamic control surfaces mounted on said aircraft for controlling it in yaw, pitch and roll.

4. A wingless aircraft comprising, a generally elongated body portion having an upwardly extending rear end, first and second ducts formed along the longitudinal axis of said body portion and extending generally vertical through said body portion and inclined relative to each other at an angle of less than sixty degrees in the shape of an inverted V, a first propulsion means mounted in the first duct, a second propulsion means mounted in the second duct, first and second transverse vanes mounted in the first and second ducts near the outlets, first and second longitudinal control vanes mounted in the first and second ducts near the outlets and, an upwardly extending fin attached to the rear of said body portion and an elevator mounted on said fin.

5. A wingless aircraft comprising, a generally elongated body portion having an upwardly extending rear end, first and second ducts formed along the longitudinal axis of said body portion and extending generally vertical through said body portion and inclined relative to each other at an angle of less than sixty degrees in the shape of an inverted V, the more rearward duct forming with said upwardly extending rear end an airfoil, said airfoil providing lift in flying position, a first propulsion means mounted in the first duct, a second propulsion means mounted in the second duct, a first pivotally mounted control surface extending transversely across said first duct and pivotally supported by said body portion below the first propulsion means and a second pivotally mounted control surface extending transversely across the second duct and pivotally supported by said body portion below the second propulsion means.

6. A wingless aircraft comprising, a generally elongated body portion having an upwardly extending rear end, first and second ducts formed along the longitudinal axis of said body portion and extending generally vertical through said body portion and inclined relative to each other at an angle of less than sixty degrees in the shape of an inverted V, a first propulsion means mounted in the first duct, a second propulsion means mounted in the second duct, a first control surface pivotally supported by said body portion transversely thereof below the first propulsion means, a second control surface pivotally supported by said body portion below the first propulsion means and supported on a longitudinal axis, a third control surface pivotally supported on a transverse axis from said body portion below the second propulsion means and a fourth control surface pivotally supported on a longitudinal axis from said body portion below the second propulsion means.

References Cited in the file of this patent

UNITED STATES PATENTS

| | | |
|---|---|---|
| 2,077,471 | Fink | Apr. 20, 1937 |
| 2,377,835 | Weygers | June 5, 1945 |
| 2,461,435 | Neumann | Feb. 8, 1949 |
| 2,488,018 | Marriage | Nov. 15, 1949 |
| 2,567,392 | Naught | Sept. 11, 1951 |

FOREIGN PATENTS

| | | |
|---|---|---|
| 316,450 | Italy | Apr. 6, 1934 |